(12) United States Patent
Lai et al.

(10) Patent No.: US 7,643,017 B2
(45) Date of Patent: Jan. 5, 2010

(54) SERVOSYSTEM

(75) Inventors: Jackie Lai, Mountain View, CA (US); Brian Finn, East Palo Alto, CA (US); Philippe Alessandrini, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 695 days.

(21) Appl. No.: 11/303,536

(22) Filed: Dec. 16, 2005

(65) Prior Publication Data

US 2006/0132469 A1 Jun. 22, 2006

Related U.S. Application Data

(60) Provisional application No. 60/636,925, filed on Dec. 17, 2004.

(51) Int. Cl.
*G09G 5/00* (2006.01)
(52) U.S. Cl. .................. 345/184; 345/156; 345/157
(58) Field of Classification Search ............. 345/184, 345/156–157
See application file for complete search history.

(56) References Cited

U.S. PATENT DOCUMENTS

| | | | | |
|---|---|---|---|---|
| 5,270,689 A | * | 12/1993 | Hermann | 345/157 |
| 6,410,866 B1 | | 6/2002 | Klein et al. | 200/5 |
| 6,636,197 B1 | | 10/2003 | Goldenberg et al. | 345/156 |
| 6,934,783 B2 | | 8/2005 | Muller et al. | |
| 2002/0057152 A1 | | 5/2002 | Elferich et al. | 335/220 |
| 2007/0013655 A1 | * | 1/2007 | Rosenberg et al. | 345/156 |

FOREIGN PATENT DOCUMENTS

| | | |
|---|---|---|
| DE | 19836261 | 12/1999 |
| DE | 19836277 | 2/2000 |
| DE | 20219655 | 3/2003 |
| EP | 0366132 | 10/1989 |
| EP | 1075979 | 7/2000 |
| EP | 1226852 | 7/2002 |
| WO | 9843261 | 10/1998 |

* cited by examiner

*Primary Examiner*—Richard Hjerpe
*Assistant Examiner*—Leonid Shapiro
(74) *Attorney, Agent, or Firm*—King & Spalding L.L.P.

(57) ABSTRACT

A servosystem, in particular a servosystem for a motor vehicle, includes a display showing a list of clickable menu items, a rotary knob with a rotary element to operate the rotary knob, with a number of mechanical detents to alternately increase the rotary momentum necessary for rotating the rotary element, with a brake to brake the rotary element and with a rotation sensor to measure the rotation of the rotary element with a resolution that is the least four times, in particular at least six times, and with particular preference at least eight times the number of mechanical detents per rotation of the rotary element, and a control for converting the rotation of the rotary element into a scrolling motion through a list and for activating the brake when the last clickable menu item of the list is reached or the first clickable menu items of the list is reached.

22 Claims, 8 Drawing Sheets

SERVOSYSTEM

CROSS-REFERENCE TO RELATED APPLICATIONS

This application claims the benefit of U.S. Provisional Application No. 60/636,925 filed on Dec. 17, 2004, entitled "BEDIENVORRICHTUNG", which is incorporated herein in its entirety.

TECHNICAL FIELD

The invention concerns a servosystem, in particular a servosystem for a motor vehicle, whereby the servosystem includes a list of clickable menu items, a rotary element and a control for converting the rotation of the rotary element into a scrolling motion through a list.

BACKGROUND

EP 1 075 979 A2 disclosed a method for operating a multifunction servosystem for a motor vehicle in which menus and/or operating functions are shown on a display device and said menus and/or functions are activated via keyboard or rotary elements. In order to ensure that when using the rotary elements for activating menus and/or functions the activation of the selected menu or the selected function is assigned more clearly and that the selected default or activation settings are recognizable haptically, provision has been made to make sure that the rotary element(s) are freely programmable with regard to the direction or rotation and rotation settings and/or resting positions and/or activation impact in such a way that haptic feedback is generated in the path of the rotation that is assigned to the respective clicked menus or functions.

The use of a rotary element for scrolling through a list is also known from U.S. Pat. No. 6,636,197 B1, WO 98/43261 and EP 0 366 132 B1.

A rotary knob with a brake is known from US 2002/00571522 A1.

DE 198 32 677 A1 disclosed a servosystem in which function groups, functions and/or function values can be selected by rotating the handle of a knob, and can be deselected by one or several input switches. In the process provision has been made to ensure that at least one input switch is mounted at or next to the perimeter of the handle of the rotary switch or within the handle of the rotary switch.

DE 198 36 261 C1 disclosed a servosystem using a rotary switch with a handle, whereby a device is provided to measure the force exerted radially on the handle of the rotary knob. By turning the handle a display mark or a display frame can be moved in horizontal or vertical direction over the display. A selected function group, function and/or a selected function value can be deselected by way of a radial force exerted on the handle of the rotary knob.

The purpose of the invention is to improve a servosystem, in particular a servosystem for a motor vehicle by adding a display to show a list with clickable menu items.

SUMMARY

The afore-mentioned purpose is achieved by a servosystem, in particular a servosystem for a motor vehicle, whereby the servosystem consists of the following components:

a display showing a list of clickable menu items, a rotary knob with a rotary element to operate the rotary knob, with a number of mechanical detents to alternately increase the rotary momentum necessary for rotating the rotary element, with a brake to brake the rotary element and with a rotation sensor to measure the rotation of the rotary element with a resolution that is the least four times, in particular at least six times, and with particular preference for at least eight times the number of mechanical detents per rotation of the rotary element, and a control for converting the rotation of the rotary element into a scrolling movement through the list and for activating the brake when the last clickable menu item of the list is reached and/or the first clickable menu items of the list is reached.

In an embodiment of the invention the rotation of the rotary element can be measured with a resolution of at least 100 per rotation by using a rotary sensor.

In another embodiment of the invention the rotation of the rotary element can be measured with a resolution of at least $450°/\alpha$ per rotation of the rotary element, in particular at least $500°/\alpha$ per rotation of the rotary element, with $\alpha$ being the angle by which the rotary sensor can be rotated when the brake is activated, in particular because of the mechanical elasticity of the rotary knob, with a momentum exerted on the rotary element of at least 0.15 Nm, in particular at least 0.5 Nm.

In another embodiment of the invention a brake momentum of at least 0.15 Nm, in particular at least 0.5 Nm, and with special preference for at least 1 Nm can be generated.

In another embodiment of the invention there are at least eight, in particular at least fifteen, mechanical detents per rotation of the rotary element. In addition, in another embodiment of the invention there are at least thirty, in particular at most twenty-five detents per rotation of the rotary element.

In another embodiment of the invention the brake can be activated via a control for a brake interval that is between 50 ms and 500 ms long, in particular between 150 ms and 300 ms long, when at least one menu item of the list lying between the first clickable menu item on the list and the last clickable menu item on the list is reached.

The above purpose is also achieved via a servosystem, in particular a servosystem for a motor vehicle in which the servosystem includes the following components:

a display to show a list of clickable menu items, a rotary switch with a rotary element to operate the rotary knob, with a brake for braking the rotary elements and with a rotation sensor to measure the rotation of the rotary element with a resolution of at last 100 per rotation of the rotary element, and a control for converting the rotation of the rotary element into a scrolling motion through a list and for activating the brake when the last clickable menu item of the list is reached and/or the first clickable menu items of the list is reached.

In an embodiment of the invention the rotation of the rotary element can be measured with a resolution of at least $450/\alpha$ per rotation by using a rotary sensor.

In another embodiment of the invention the rotation of the rotary element can be measured by using a rotary sensor with a resolution of at least $450°/\alpha$ per rotation of the rotary element, in particular at least $500°/\alpha$ per rotation of the rotary element, with $\alpha$ being the angle around which the rotary sensor can be rotated when the brake is activated, in particular because of the mechanical elasticity of the rotary knob, with a momentum exerted on the rotary element of at least 0.15 Nm, in particular at least 0.5 Nm.

In another embodiment of the invention a brake momentum of at least 0.15 Nm, in particular at least 0.5 Nm, and preferably at least 1 Nm can be generated via a brake.

In another embodiment of the invention a brake momentum of at most 2 Nm, in particular at most 1.5 Nm can be generated via a brake.

In another embodiment of the invention the brake can be activated via a control for a brake interval that is between 50 ms and 500 ms long, in particular between 150 ms and 300 ms long, when at least one menu item of the list lying between the first clickable menu item on the list and the last clickable menu item on the list is reached.

The above purpose is also achieved via a servosystem, in particular a servosystem for a motor vehicle in which the servosystem includes the following components:

a display to show a list of clickable menu items, a rotary knob with a rotary element to operate the rotary knob, with a brake for braking the rotary elements and with a rotation sensor to measure the rotation of the rotary element with a resolution of at last 450°/α per rotation of the rotary element, in particular at least 500°/α per rotation of the rotary element, with α being the angle around which the rotary sensor can be rotated when the brake is activated, in particular because of the mechanical elasticity of the rotary knob, with a momentum exerted on the rotary element of at least 0.15 Nm, in particular at least 0.5 Nm, and a control for converting the rotation of the rotary element into a scrolling motion through a list and for activating the brake when the last clickable menu item of the list is reached and/or the first clickable menu items of the list is reached.

In an embodiment of the invention a brake momentum of at least 0.15 Nm, in particular at least 0.5 Nm, and more particularly at least 1 Nm can be generated via a brake.

In another embodiment of the invention a brake momentum of at most 2 Nm, in particular at most 1.5 Nm can be generated via a brake.

In another embodiment of the invention the brake can be activated via a control for a brake interval that is between 50 ms and 500 ms long, in particular between 150 ms and 300 ms long, when at least one menu item of the list lying between the first clickable menu item on the list and the last clickable menu item on the list is reached.

The above purpose is also achieved via a servosystem, in particular a servosystem for a motor vehicle in which the servosystem includes the following components:

a display showing a list of clickable menu items, a rotary knob with a rotary element to operate the rotary knob, with a brake for braking the rotary element and with a brake momentum of at last 0.15 Nm, in particular at least 0.5 Nm, and a control for converting the rotation of the rotary element into a scrolling motion through the list and for activating the brake when the last clickable menu item of the list is reached and/or the first clickable menu items of the list is reached.

In an embodiment of the invention a brake momentum of at least 1 Nm can be generated via a brake.

In another embodiment of the invention a brake momentum of at most 2 Nm, in particular at most 1.5 Nm can be generated via a brake.

In another embodiment of the invention the brake can be activated via a control for a brake interval that is between 50 ms and 500 ms long, in particular between 150 ms and 300 ms long, when at least one menu item of the list lying between the first clickable menu item on the list and the last clickable menu item on the list is reached.

The above purpose is also achieved via a servosystem for motor vehicles comprising in particular one or more of the afore-mentioned characteristics, whereby the servosystem includes a display showing a list of clickable menu items, a rotary knob, a number of mechanical detents for alternately increasing a rotational momentum necessary for rotating the rotary element, a brake for braking the rotary element, a rotary sensor for measuring the rotation of the rotary element and a control for converting the rotation of the rotary element into a scrolling motion through a list and for activating the brake when the last clickable menu item of the list is reached and/or when the first clickable menu item of the list is reached.

A rotary sensor in the sense of the invention is in particular an encoder. A rotary sensor in the sense of the invention is in particular a device emitting an impulse or something similar or a changed code depending on its trigger mechanism. The resolution of the rotary sensor in the sense of the invention is in particular an increment or a code step of an encoder.

A brake in the sense of the invention is in particular an electromagnetic brake.

A list of clickable menu items in the sense of the invention may e.g. be a list of clickable radio stations, a list of clickable music titles, a list of clickable CDs or a list of clickable operating functions. A list of clickable menu items in the sense of the invention may e.g. also be a numeric or alphanumeric keyboard, a selection of telephone numbers or addresses or a selection of letters of the alphabet for inputting a destination into a navigation system. A list of clickable menu items in the sense of the invention may e.g. also be a volume setting, a temperature setting or a balance setting. The individual increments of the volume setting, the temperature setting or the balance setting correspond e.g. to the clickable menu items in the sense of the invention.

A motor vehicle in the sense of the invention is in particular a land-based vehicle used individually in road transportation. Motor vehicles in the sense of the invention are in particular not limited to land-based vehicles with a combustion engine.

Other advantages and details are shown in the following description of the examples of embodiment.

DETAILED DESCRIPTION

Figure 1:
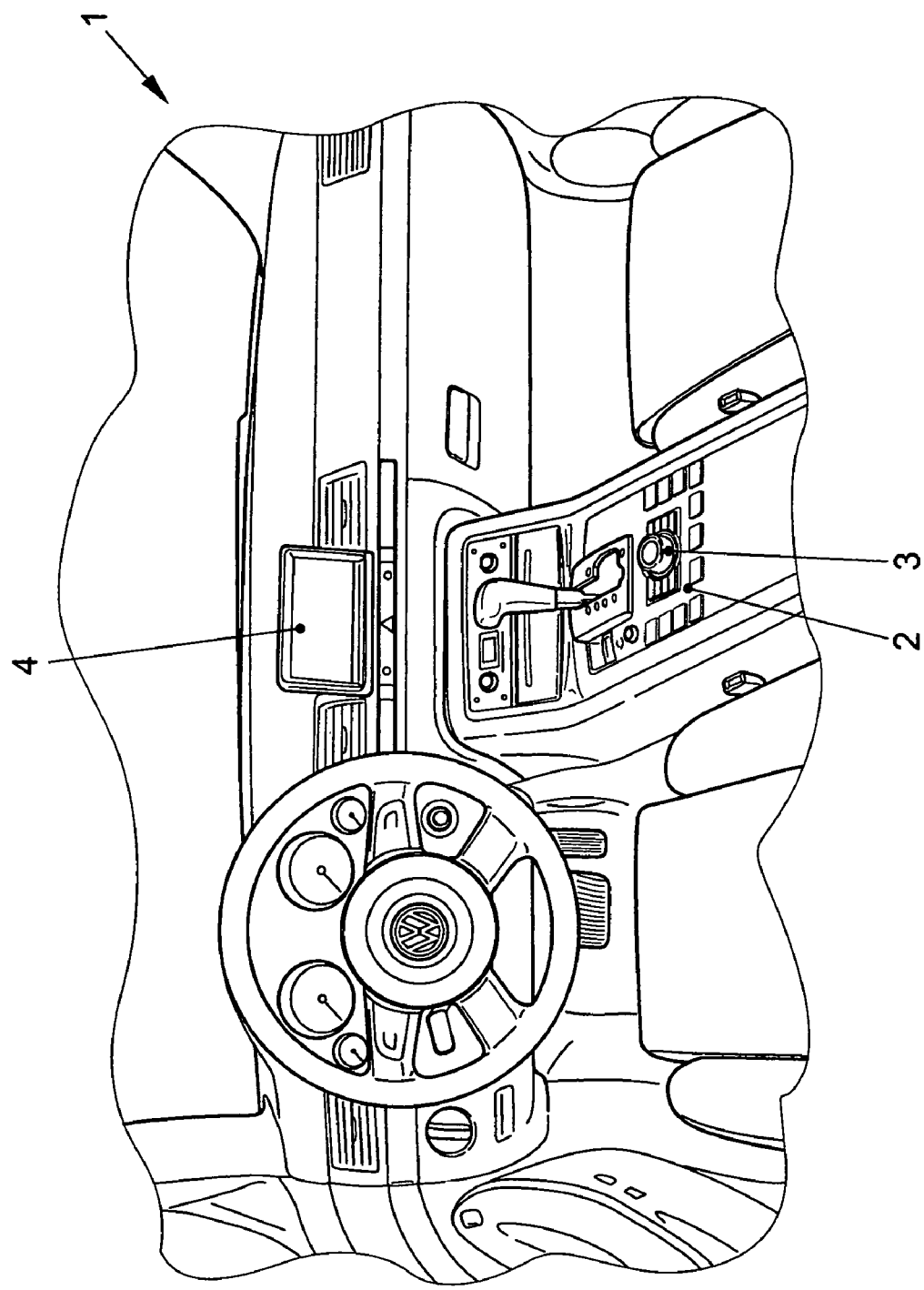
FIG. 1 shows an embodiment example of the interior view of a motor vehicle.

FIG. 1 shows an embodiment example of the interior view of a motor vehicle 1. The motor vehicle 1 includes a servosystem shown schematically in FIG. 2, e.g. for operating a radio 11 of the motor vehicle 1, a CD player 12 of the motor vehicle 1, a navigation system 13 of the motor vehicle 1, an air conditioning system 14 of the motor vehicle 1 or a telephone 15 of the motor vehicle 1 or a telephone installed in the motor vehicle 1. The servosystem includes a display 4 showing a list of clickable menu items such as e.g. the stations 'BAYERN 5', 'RADIO IN', 'BAYERN 1', 'BAYERN 2' AND 'BAYERN 3' shown in FIG. 2, a rotary knob 3 mounted on a servopanel 2 and a control 10 for converting a rotation executed via a rotary knob 3 into a scrolling motion through a list.

The control 10 is connected to the radio 11, the CD player 12, the navigation system 13, the air conditioning system 14 and the telephone 15 via a bus system 16 for the transfer of data.

Figure 3:
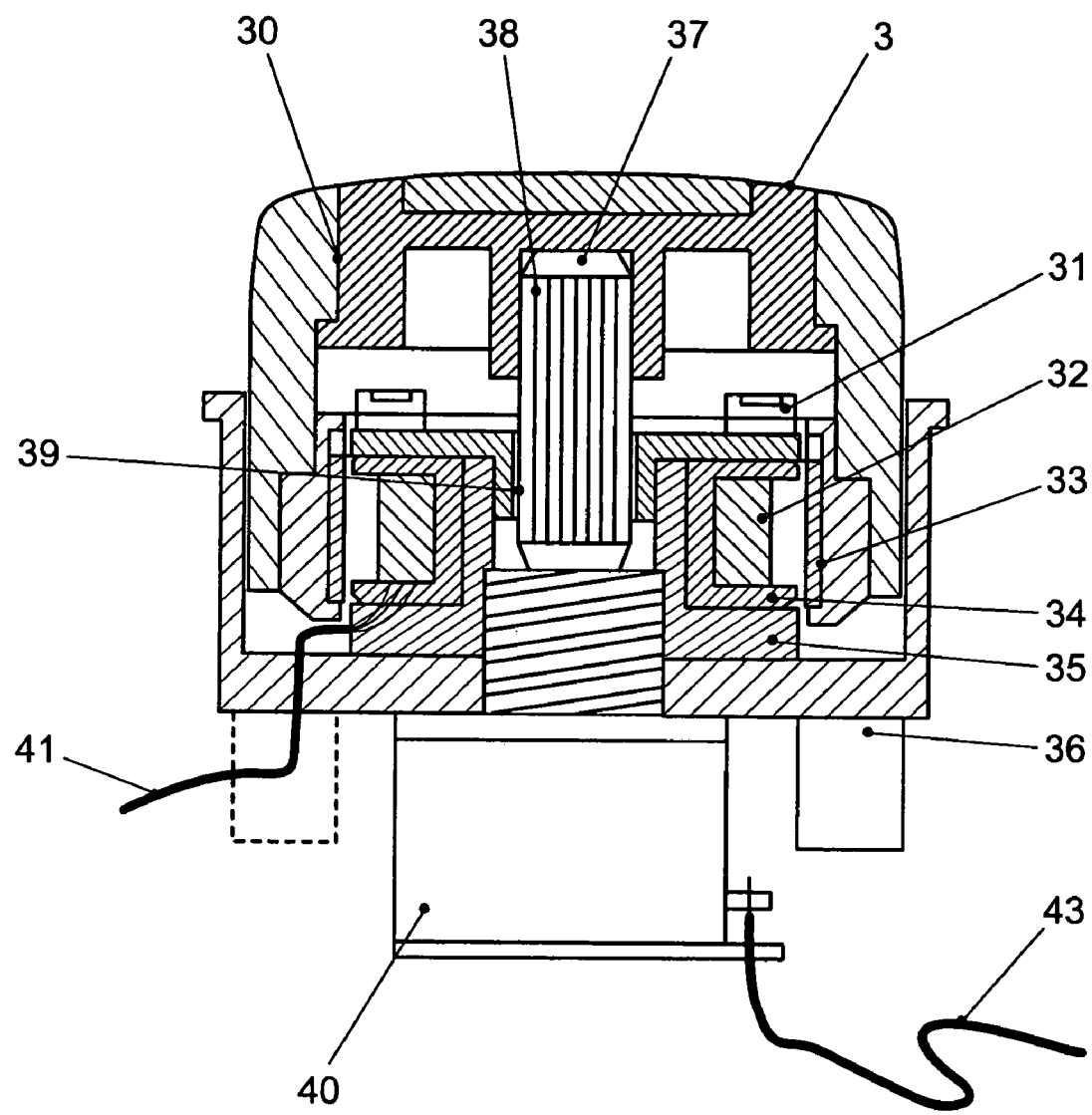
FIG. 3 shows an embodiment example of a rotary knob.

FIG. 3 shows the example of an embodiment of the rotary knob 3. The rotary knob 3 includes a rotary element 30 for operating the rotary knob 3. The rotary element 30 connected mechanically by way of a tenon 37 to a brake 35 for braking the rotary element 30 and to a rotary sensor 30 executed as an encoder for measuring the rotary motion of the rotary element 30. The brake 35 includes a ring 33 and a core 34 with a spool 32 to which electrical power can be supplied via a line 41.

Figure 4:
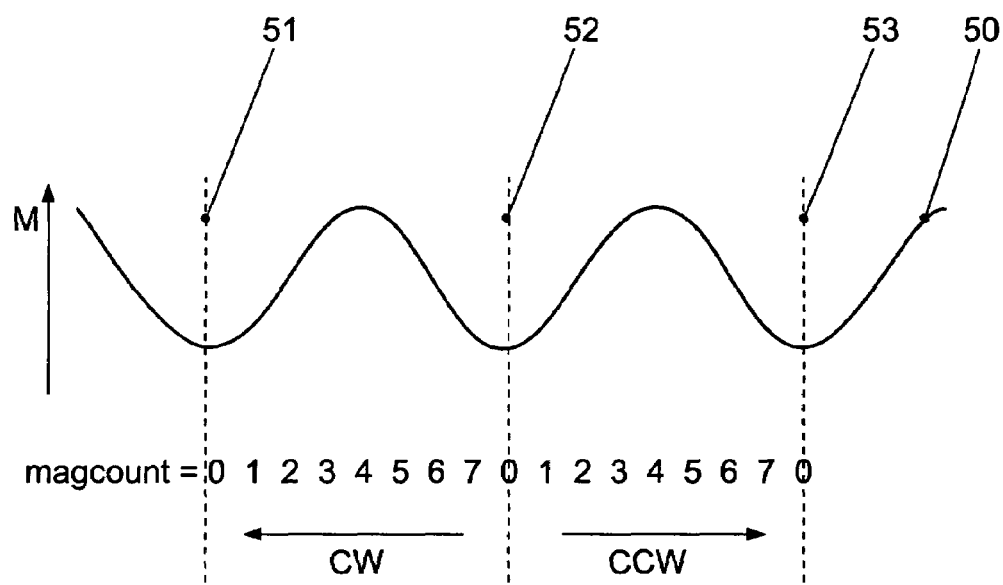
FIG. 4 shows an embodiment example of the assignment of detents to the output signal of a rotary sensor.

The tenon 37 includes a number of recesses 38 or cogs which together with a spring 39 form the necessary number of mechanical detents that alternately increase the rotary momentum necessary for rotating the rotary element when rotating the rotary element 30. An example of an alternating increase of the rotary momentum necessary for rotating the rotary element 30 is shown in FIG. 4, with the reference 50 designating as value M the rotary momentum necessary for rotating the rotary element 30. The broken lines 51, 52 and 53 through the minimum values of the rotary momentum 50 indicate the center of the spaces between the recesses 38 or cogs. CW indicates a clockwise rotation and CCW indicates a counter-clockwise rotation.

The numbers shown under the rotary momentum 50 in FIG. 4 show the resolution of the rotary sensor 40, with the distance between two numbers being equal to the resolution of the rotary sensor 40. The resolution of the rotary sensor 40 is at least four times, in particular at least six times, with particular preference for at least eight times the number of mechanical detents per rotation of the rotary element 30. As shown in FIG. 4, the resolution of the rotary sensor 40 with regard to the example of embodiment at hand is eight times the number of mechanical detents per rotation of the rotary element 30. This example provides for twenty mechanical detents per rotation of the rotary element 30, making the resolution of the rotary sensor 40 160 per rotation.

In a particularly useful embodiment the rotation of the rotary element 30 can be measured with the help of the rotary sensor at a resolution of at least 450°/α per rotation of the rotary element, in particular 500°/α per rotation of the rotary element, with α being the smallest angle around which the rotary sensor can be rotated when the brake is activated, in particular because of the mechanical elasticity of the rotary know, with a momentum exerted on the rotary element of at least 0.15 Nm, in particular of at least 0.5 Nm.

Reference 31 in FIG. 3 designates a LED to illuminate the rotary knob 3, and reference 36 in FIG. 3 designates a mounting pin for mounting the rotary knob 3 in the motor vehicle 1.

The control 10 is connected to the brake 35 via a line 41 and to the rotary sensor 40 via a line bearing the reference 43. The control 10 allows converting the rotation of the rotary element 30 measured via the rotary sensor 40 into a scrolling motion through a list of clickable menu items, such as e.g. the stations 'BAYERN 5', 'RADIO IN', 'BAYERN 1', 'BAYERN 2' AND 'BAYERN 3' shown in FIG. 2. The control 10 also activates brake 35 when the last clickable menu item of the list is reached and when the first clickable menu item of the list is reached. In terms of the list of the radio stations 'BAYERN 5', 'RADIO IN', 'BAYERN 1', 'BAYERN 2' AND 'BAYERN 3' shown in FIG. 2 this means that the control 10 activates the brake 35 during the upward scroll when the clickable menu item 'BAYERN 5' is reached, and during the downward scroll when the clickable menu item 'BAYERN 3' is reached. By activating the brake 35, in one embodiment of the invention a braking momentum of at least 0.15 Nm, in particular of at least 0.5 Nm, with particular preference for at least 1 Nm can be generated with the brake, and in another embodiment of the invention a braking momentum of at most 2 Nm, in particular of at most 1.5 Nm can be generated with the brake.

Figure 5:
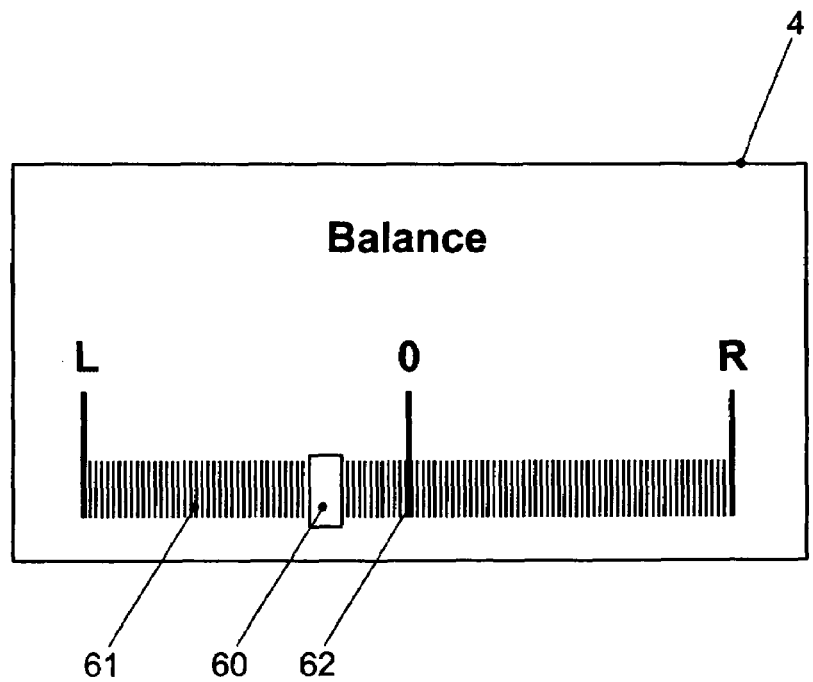
FIG. 5 shows an embodiment example of a display.

A list of clickable menu items in the sense of the invention may also include e.g. a balance setting 61 shown by way of example in FIG. 5. In this example the individual increments of the balance setting 61, thus in this example of embodiment the possible positions of a slide designated by reference 50, correspond to the clickable menu items in the sense of the invention. With regard to the balance setting 61 shown by way of example in FIG. 5 provision has been made so that the brake 35 can be activated via the control 10 for a brake interval that lasts in particular between 50 ms and 500 ms, in particular between 150 ms and 300 ms and 250 ms in the embodiment example when the slide 60—irrespective from which direction it comes—reaches a central position designated with reference 622.

FIG. 6A, FIG. 6B, FIG. 6C and FIG. 6D show an example of embodiment of a method or process implemented in the control 10 for activating and deactivating the brake 35, whereby the process is subdivided for reasons of clarity in four parts shown respectively in FIG. 6A, FIG. 6B, FIG. 6C and FIG. 6D whose connection points are designated by circled numbers. In the example 'brake on' refers to the activation of the brake 35 and 'brake off' refers to the deactivation of the brake 35.

Figure 2:
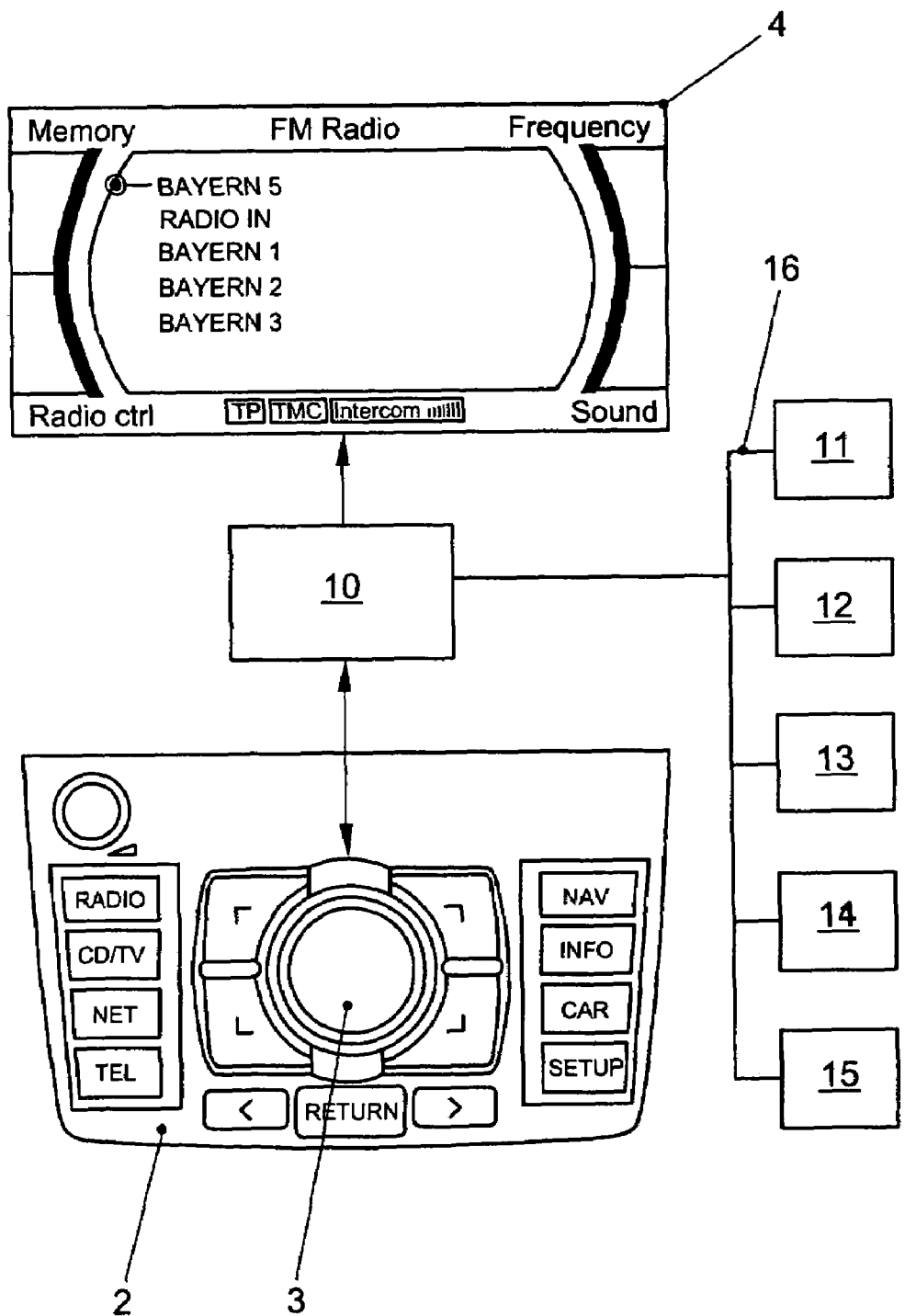
FIG. 2 shows an embodiment example of a servosystem.

The variable 'list' refers to the number of the shown clickable menu items, thus with regard to FIG. 2 '5' and with regard to FIG. 5 e.g. '19'. The variable 'item' refers to the index of a clickable menu item, thus e.g. '3' for 'BAYERN 1' in FIG. 2. The variable 'enc_count_per_detent' refers to the number of encoder steps per detent, thus the enc_count_per_detent multiple of the resolution of the rotary sensor 40 per detent, i.e. in this example of embodiment '8'. The variable 'magcount' is a counter shown in FIG. 4 which—depending on the direction of the rotation—is counted up or down in steps corresponding to the resolution of the rotary sensor 40, whereby, when counting down and after reaching '0', the beginning of the count is enc_count_per_detent-1, thus '7', and when counting up and after reaching enc_count_per_detent-1, thus '7', the count is '0'. The variable 'encdir' refers to the direction of the rotation. The variable 'EncDetentPosition' refers to position of the rotary element 30 defined by the detents and can take any value between 0 and the number of detents less 1.

The process according to FIG. 6A, FIG. 6B, FIG. 6C and FIG. 6D begins with an initialization step 70 in which e.g. the current values of the variables 'list', 'item' and 'encdir' can be read in, magcount is set equal to enc_count_per_detent-1 and the counter readout of the rotary sensor 40 and the variable 'EncDetentPosition' are read in.

Reference 71 refers to the question—whether—as e.g. in the menu shown in FIG. 5 for the central position 63—provision has been made for activating the brake 35 via the control for the duration of a brake interval when a certain clickable menu item of the list lying between the first clickable menu item of the list and the last clickable menu item of the list is reached. References 72, 73 and 77 refer to a step each in which the variable 'encdir' and the counter readout of the rotary sensor 40 are read in. Reference 74 refers to the question whether the rotary sensor 40 supplies a measured value that differs from the previous measured value by at least the resolution of the rotary sensor 40. References 75 and 76 refer to a step each in which the direction of the rotation that has been determined (step 75: CCW; step 76: CW) is sent to a module (of the control 10) for adjusting the display 4.

Figure 6A:
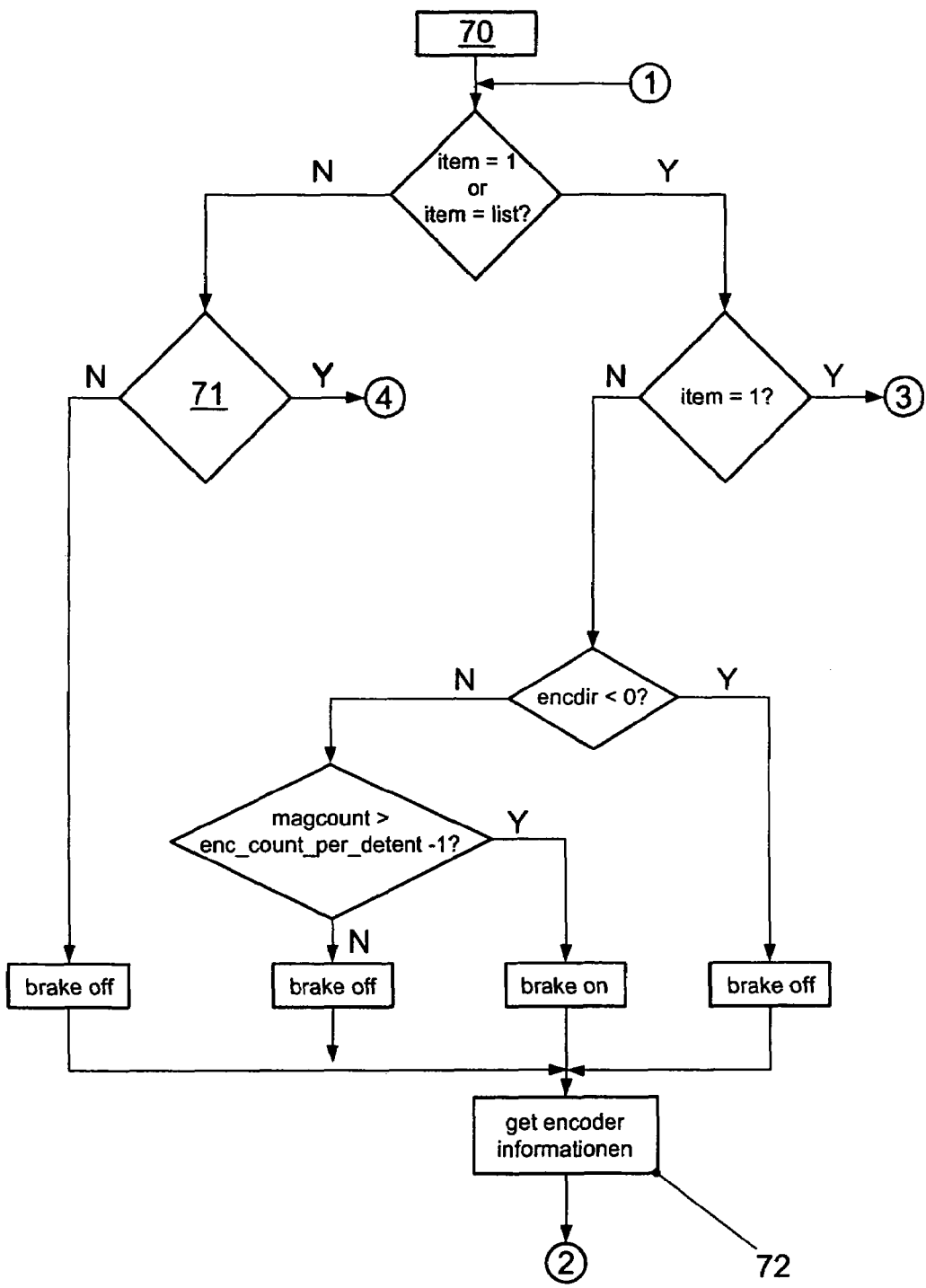
FIG. 6A shows part of an embodiment example of the sequence of steps for operating a servosystem.
Figure 6B:
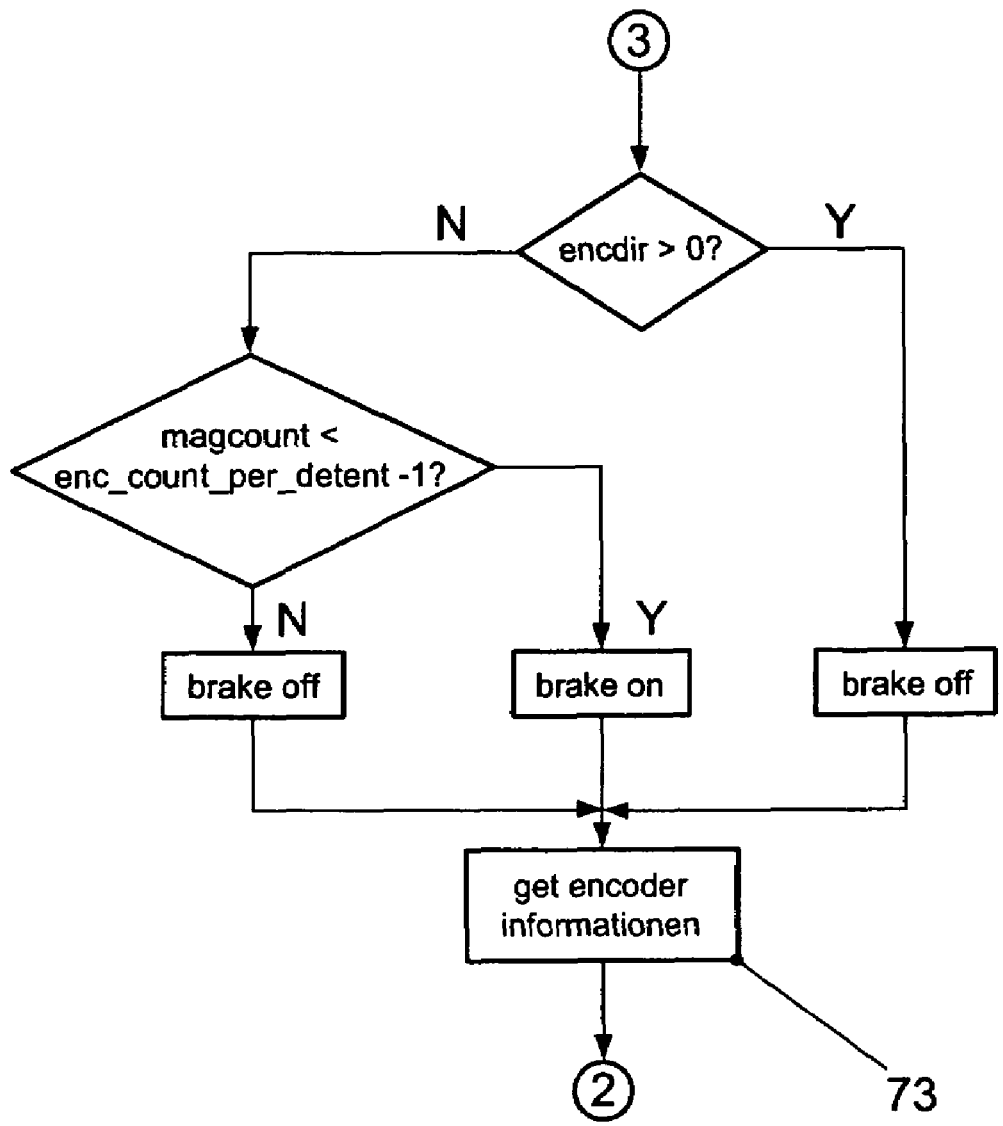
FIG. 6B shows another part of the sequence of steps for operating a servosystem according to FIG. 6A.
Figure 6C:
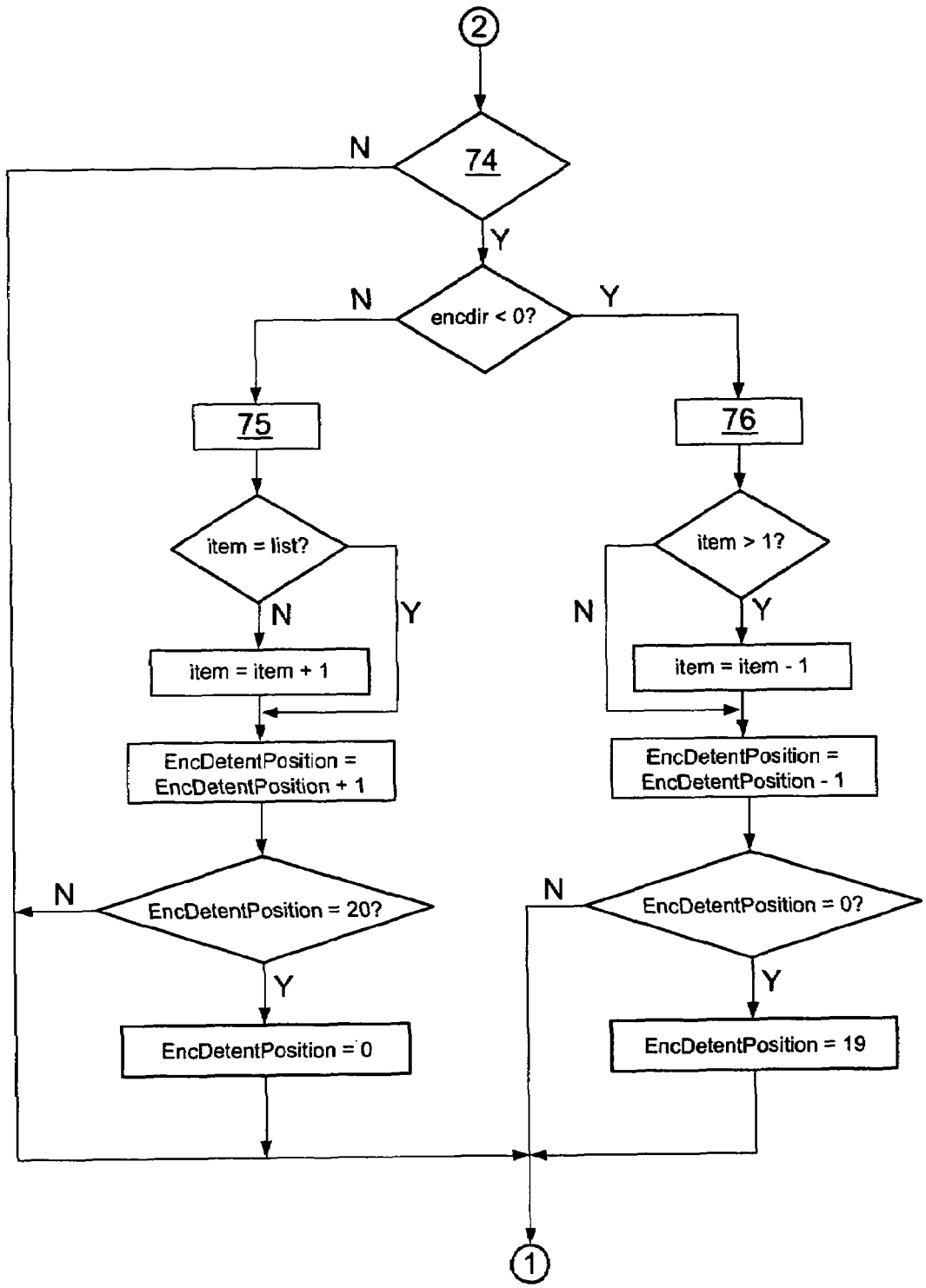
FIG. 6C shows another part of the sequence of steps for operating a servosystem according to FIG. 6A and FIG. 6B.
Figure 6D:
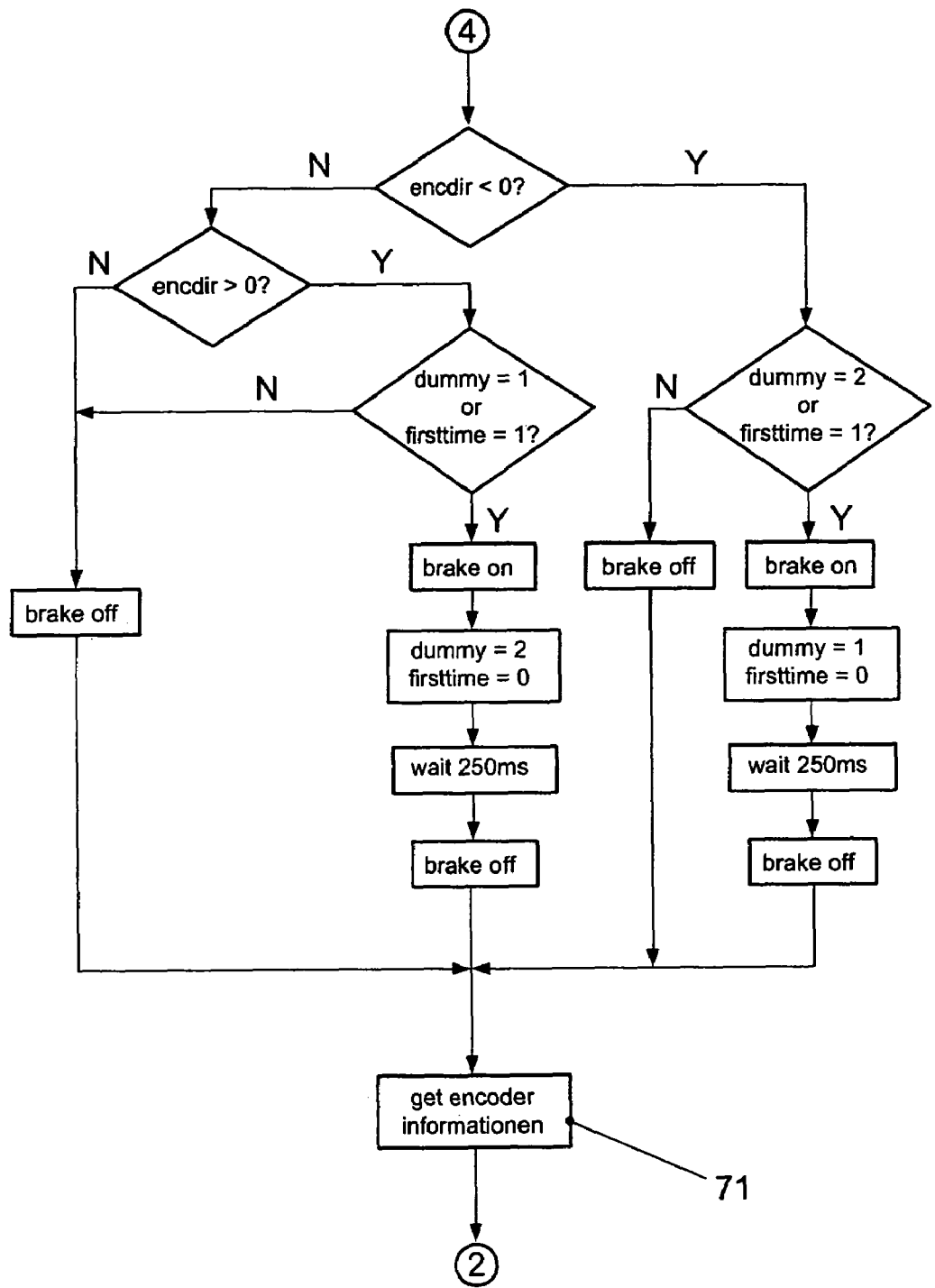
FIG. 6D shows another part of the sequence of steps for operating a servosystem according to FIG. 6A, FIG. 6B and FIG. 6C.

The variable 'dummy' shown in FIG. 6D is—if applicable—read in during the initialization step 70, whereby 'dummy' in the example of embodiment shown in FIG. 5 may be '1' or '2' depending on the position of the slide 60. The variable 'firsttime' shown in FIG. 6D is—if applicable—set to '1' during the initialization step.

The control 10 may be designed in several components or may be implemented in one device. It is possible to allow for a selection of a clicked menu item e.g. by pressing the rotary element 30.

LIST OF REFERENCES

1 Motor vehicle
2 Servopanel
3 Rotary knob
4 Display
10 Control
11 Radio
12 CD player
13 Navigation system
14 Air conditioning
15 Telephone
16 Bus system
30 Rotary element
31 LED
32 Spool
33 Ring
34 Core
35 Brake
36 Mounting pin
37 Tenon
38 Recess
39 Spring
40 Rotary sensor
41,43 Feeder line
50 Rotary momentum
51, 52, 53 Broken line
60
61 Balance setting
62 Central position
70 Initialization step
71, 74 Query
72, 73, 75, 76, 77 Step
M Value of a rotary momentum
CW clockwise
CCW counter-clockwise

What is claimed is:

1. A servosystem for a vehicle comprising:
a display showing a list of clickable menu items;
a rotary knob with a rotary element for operating the rotary knob with a list of clickable menu items, with a number of mechanical detents to alternatively increase the rotary momentum necessary for rotating the rotary element, with a brake to brake the rotary element and with a rotation sensor to measure the rotation of the rotary element with a resolution that is at least four times the number of mechanical detents per rotation of the rotary element, and
a control for converting the rotation of the rotary element into a scrolling motion through a list and for activating the brake when the last clickable menu item of the list is reached or the first clickable menu items of the list is reached.

2. A servosystem according to claim 1, wherein the rotation of the rotary element can be measured with a resolution of at least 100 per rotation by using a rotary sensor.

3. A servosystem according to claim 1, wherein the rotation of the rotary element can be measured with a resolution of at least 450°/α per rotation of the rotary element using the rotary sensor, with α being the smallest angle by which the rotary sensor can be rotated with a momentum exerted on the rotary element of at least 0.15 Nm when the brake is activated.

4. A servosystem according to claim 1, wherein a brake momentum of at least 0.15 Nm can be generated with the brake.

5. A servosystem according to claim 4, wherein a brake momentum of at least 1 Nm can be generated with the brake.

6. A servosystem according to claim 4, wherein a brake momentum of at most 2 Nm can be generated with the brake.

7. A servosystem according to claim 6, wherein a brake momentum of at most 1.5 Nm can be generated with the brake.

8. A servosystem according to claim 1, wherein at least eight, in particular at least fifteen, mechanical detents are provided per rotation of the rotary element.

9. A servosystem according to claim 8, wherein at most thirty mechanical detents are provided per rotation of the rotary element.

10. A servosystem according to claim 1, wherein the brake can be activated via a control for a brake interval when at least one menu item of the list lying between the first clickable menu item on the list and the last clickable menu item on the list is reached.

11. A servosystem according to claim 10, wherein the brake interval lasts between 50 ms and 500 ms.

12. A servosystem for a motor vehicle comprising:
a display showing a list of clickable menu items;
a rotary knob with a rotary element for operating the rotary knob with a list of clickable menu items, with a brake to brake the rotary element and with a rotation sensor to measure the rotation of the rotary element with a resolution of at least 100 per rotation of the rotary element; and
a control for converting the rotation of the rotary element into a scrolling motion through a list and for activating the brake when the last clickable menu item of the list is reached or the first clickable menu items of the list is reached, wherein the brake can be activated via a control for a brake interval when at least one menu item of the list lying between the first clickable menu item on the list and the last clickable menu item on the list is reached.

13. A servosystem according to claim 12, wherein the brake interval lasts between 50 ms and 500 ms.

14. A servosystem for a motor vehicle comprising:
a display showing a list of clickable menu items;
a rotary knob with a rotary element for operating the rotary knob, with a brake to brake the rotary element and with a rotation sensor to measure the rotation of the rotary element with a resolution of at least 450°/α per rotation of the rotary element using the rotary sensor, with α being the smallest angle by which the rotary sensor can be rotated with a momentum exerted on the rotary element of at least 0.15 Nm when the brake is activated; and
a control for converting the rotation of the rotary element into a scrolling motion through the list and for activating the brake when the last clickable menu item of the list is reached or the first clickable menu items of the list is reached.

15. A servosystem according to claim 14, wherein a brake momentum of at least 0.15 Nm can be generated with the brake.

16. A servosystem according to claim 15, wherein a brake momentum of at least 1 Nm can be generated with the brake.

17. A servosystem according to claim 15, wherein a brake momentum of at most 2 Nm can be generated with the brake.

18. A servosystem according to claim 17, wherein a brake momentum of at most 1.5 Nm can be generated with the brake.

19. A servosystem according to claim 14, wherein the brake can be activated via a control for a brake interval when at least one menu item of the list lying between the first clickable menu item on the list and the last clickable menu item on the list is reached.

20. A servosystem according to claim 19, wherein the brake interval lasts between 50 ms and 500 ms.

21. A servosystem for a motor vehicle comprising:
a display showing a list of clickable menu items;
a rotary knob with a rotary element for operating the rotary knob, with a brake to brake the rotary element with a brake momentum of at least 0.15 Nm; and
a control for converting the rotation of the rotary element into a scrolling movement through the list and for activating the brake when the last clickable menu item of the list is reached or the first clickable menu items of the list is reached, wherein the brake can be activated via a control for a brake interval when at least one menu item of the list lying between the first clickable menu item on the list and the last clickable menu item on the list is reached.

22. A servosystem according to claim 21, wherein the brake interval lasts between 50 ms and 500 ms.

* * * * *